United States Patent [19]

Mittelman et al.

[11] Patent Number: 5,546,241

[45] Date of Patent: Aug. 13, 1996

[54] PROJECTOR SLIDES FOR NIGHT VISION TRAINING

[75] Inventors: Michael H. Mittelman; David L. Still; Leonard A. Temme, all of Pensacola, Fla.

[73] Assignee: The United States of America as represented by the Secretary of the Navy, Washington, D.C.

[21] Appl. No.: 295,581

[22] Filed: Aug. 25, 1994

[51] Int. Cl.$^6$ ........................................... G02B 5/22
[52] U.S. Cl. ........................... 359/885; 359/888; 359/892
[58] Field of Search ....................... 359/885, 887, 359/888, 890, 892, 894, 450, 614, 227, 232, 450; 353/22, 23, 25, 120, 35, 84; 40/159.2, 158.1, 159; 206/455, 456

[56] References Cited

U.S. PATENT DOCUMENTS

| | | | |
|---|---|---|---|
| 2,164,655 | 7/1939 | Kleerup | 156/492 |
| 2,887,010 | 5/1959 | Ruettiger | 359/888 |
| 3,649,100 | 3/1972 | Kirst | 359/485 |
| 4,126,321 | 11/1978 | Wright | 277/113 |
| 4,575,230 | 3/1986 | Carson | 355/75 |
| 4,688,910 | 8/1987 | Deary | 353/88 |
| 5,162,827 | 11/1992 | Marshall | 353/120 |

FOREIGN PATENT DOCUMENTS 1569849  6/1980  United Kingdom.

*Primary Examiner*—Paul M. Dzierzynski
*Assistant Examiner*—Darren E. Schuberg
*Attorney, Agent, or Firm*—A. David Spevack; William C. Garvert

[57] ABSTRACT

A slide holding a film with an image containing portion adapted for use in an application such as Night Vision Goggle training in which the film in the slide is to receive an extremely low level of light. A combination of filters is placed adjacent the light receiving face of the film and an opaque mat having a cutout corresponding to the film image bearing portion is placed adjacent both the light receiving side of the filters and the light output face of the film to reduce the amount of stray light reaching the film with the components held together by a pair of frame members each holding a glass plate next to a mat.

11 Claims, 1 Drawing Sheet

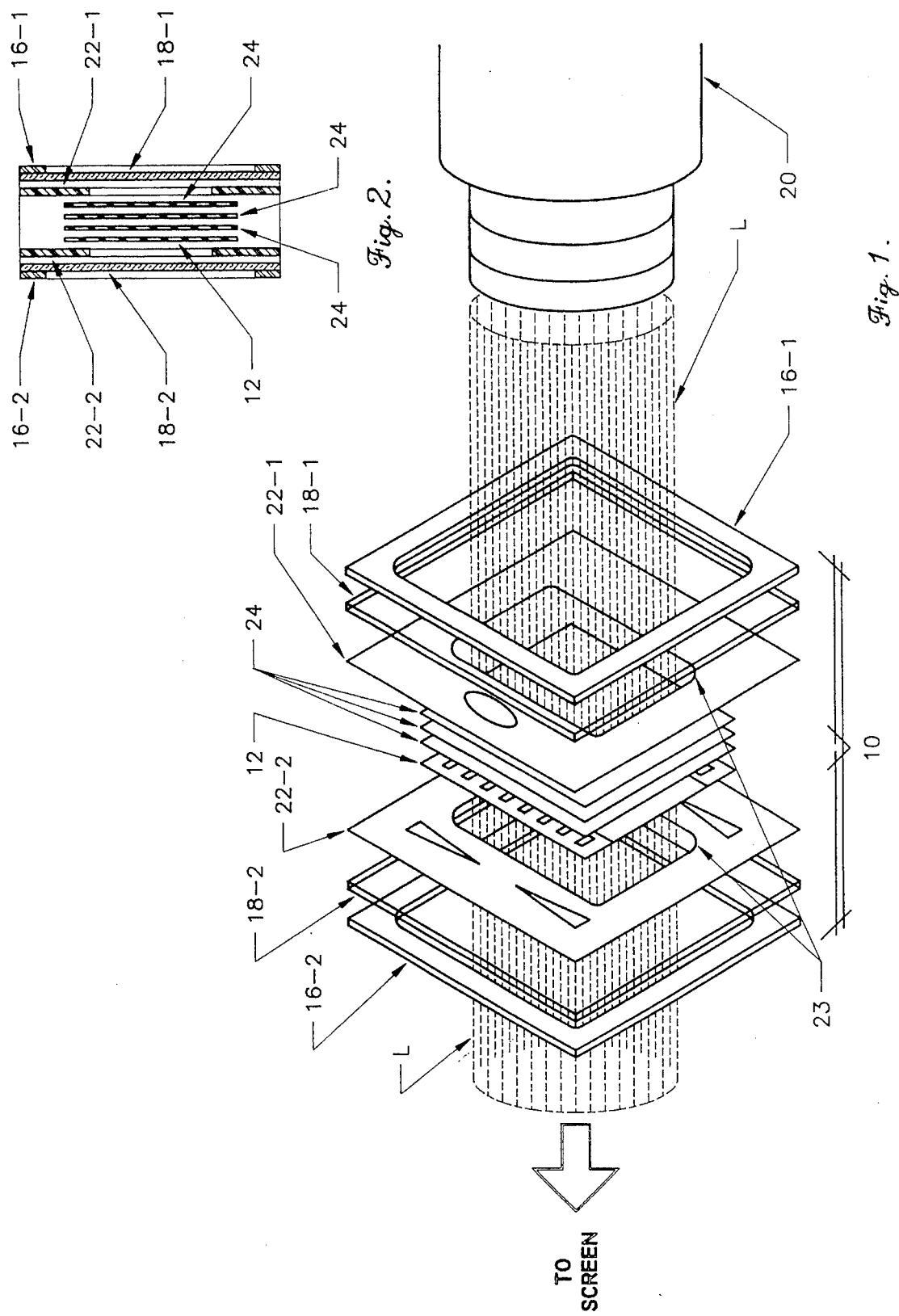

PROJECTOR SLIDES FOR NIGHT VISION TRAINING

BACKGROUND OF THE INVENTION

A requirement exists to train personnel for low light level night viewing conditions both with the naked eye and also with devices such as Night Vision Goggles (NVGs). NVGs, which are optical devices with electronic light amplification capability, are widely used in a variety of applications including various types of military operations. The training of personnel to efficiently use NVGs and to see unaided under low level light conditions is carried out in several ways. Included among these is the use of projector slides having films with photographic, artwork drawings or computer generated images of various types of information such as possible battle scenes. The film image is projected onto a surface, such as a viewing screen, at light levels encountered during the night and the trainee views the projected image with unaided night vision or though the NVG.

Slides used with a light projector during low light level training with unaided night vision or with NVGs must satisfy a variety of requirements. Included among these is that the amount of light coming from the projector must be reduced by a factor of about 1,000,000 from that of projector light output in the more usual situation of a slide projector producing light under normal ambient light conditions. If the light level is not reduced, then the NVG electron-optics will be saturated since the NVG is designed to operate at extremely low level light conditions.

At the very low level of light required in an unaided night vision or NVG application, the control of light fluctuations on the slide film is difficult and becomes critical. Also, the spectrum of the light projected onto the slide may have to be altered from the normal human visible light range spectrum to be compatible with the spectral sensitivity of the NVG. In addition, the slide film can absorb heat from the projected light which can cause distortions in the slide film resulting in a distortion of the projected image.

OBJECTS OF THE INVENTION

It is therefore an object of the present invention to provide an improved slide which is useful with extremely low levels of light projected on the slide film.

An additional object is to provide a slide including a film with an image thereon which has reduced sensitivity to stray light with the slide being capable of being used in a low light level environment such as for training in unaided night vision or the use of NVGs.

A further object is to provide a slide which can be provided with filters to control the intensity and/or spectrum of the light impinging on the slide film.

Another object is to provide a slide which has reduced sensitivity to stray light.

Yet another object is to provide a slide having a stable mounting for the film so that the film will not be adversely effected by the heat from the light projected onto it.

BRIEF DESCRIPTION OF THE INVENTION

The invention is directed to a novel slide which is particularly adapted for use in an application where an extremely low level of light is projected onto the slide film and the image on the film must be protected from stray light. The slide also permits control of the intensity and/or spectrum of the light impinging on the slide film.

In accordance with the invention, the slide includes the film with one or more optical filters held adjacent the film light receiving face. The filters control the intensity and/or the spectrum of the light reaching the film. The film and filters are sandwiched between a pair of mats of opaque material each having an opening which is aligned with the image bearing portion of the film. The mats block stray light from reaching the film. A glass plate held by a frame member is placed adjacent each mat and the frame members are fastened together to complete the slide assembly.

The slide according to the invention holds the filters in a fixed relationship to the film and makes the film relatively insensitive to heat distortion.

BRIEF DESCRIPTION OF THE DRAWINGS

Other objects and advantages of the prevent invention will become more apparent upon reference to the following specification and annexed drawings in which:

FIG. 1 is an exploded perspective view of the slide; and

FIG. 2 is a side elevational view of an assembled slide in cross-section.

DETAILED DESCRIPTION OF THE DRAWINGS

Referring to the drawings, the slide 10 is for the purpose of holding a film transparency 12 which is to receive light L from a projector 20. The light from projector 20 is of a very low level, corresponding to the available light in a night viewing situation, and preferably has a spectrum which is close to that of the light sensor electronics of the NVG with which the slide is to be used for training purposes.

The film 12 is basically a flexible film negative having a portion with an image thereon which is to be projected onto a screen (not shown). Any desired information can form the film image such as a photograph, an artwork rendition of a scene or situation, or a computer generated image. In the application for the slide under consideration, this information is suitable for NVG training.

Considering the slide 10 from its light receiving side closest to projector 20, there is a front frame piece 16-1 with a peripheral channel in which a front clear glass sheet 18-1 is held. The frame 16 can be of any suitable material such as plastic or metal. Adjacent the front glass plate 18-1 is a front mat 22-1 of an opaque material which can be, for example, of metal, cardboard or plastic. The mat thickness and material are selected so that the mat is opaque to the light from the projector 20 and any stray light which reaches it. The mat 22-1 has a central cutout portion 23 which corresponds to and is aligned with the image bearing portion of the film 12.

The mat 22-1 reduces the amount of stray light which reaches the light receiving face of the film 12. Stray light is the light that is scattered in the overall optical system, primarily by inadvertent partial reflections and diffractions. In an application where the slide is to be used in an NVG training application, since the light from the projector 20 is of an extremely low level and the NVG is extremely sensitive, it is desired to eliminate as much of the stray light from affecting the film 12 as possible.

The mat 22-1 positions one or more filters 24, three such filters being shown by way of illustration, adjacent the light receiving face of the film 12. The filters, which can be of flexible or rigid material, preferably are a combination of commercially available neutral density filters, or exposed and developed colored film, or exposed and developed black and white film. The filters 24 attenuate the light from the projector 20 which impinges upon the film 12 to a desired level. A combination of different types of filters are preferably selected to attenuate the light reaching the film 20 and are combined to achieve the desired attenuation for each slide. The filters 24 also can modify the spectrum of the light reaching the film. In selecting the filters, they are combined in the appropriate type and quantity and viewed with an NVG to ensure that the overall filter attenuation characteristic is as needed for a given slide. Assembling a slide while viewing with an NVG ensures that the finished slide product is adequate.

The slide also has a rear opaque mat 22-2 of the same or similar construction as the front mat 22-1 on the light output side of the film. The rear mat 22-2 also serves to block stray light from reaching the image on the film 12. A rear clear glass plate 18-2 mounted within a rear frame 16-2 holds the rear mat 22-2 against the film with its cutout 23 aligned with the film image bearing portion. The rear frame 16-2 is similar in construction to the front frame 16-1.

The finished slide includes the front and rear frames 16 each holding a glass plate 18 with the front and rear mats 18, filters 24 and the film 12 assembled therebetween. The assembly is held together by any suitable fastening arrangement. This can be, for example, having plastic frame members with mating snap fit tabs and sockets, adhesive tape around the outer periphery of the frame members, ultrasonic welding of plastic frame members, or an adhesive which fastens the frame members together.

In a typical application the overall outer dimensions of the slide 10, i.e. frames 16, glass plates 18 and mats 22, are approximately 50 mm×50 mm, the film 12 approximately 35 mm×38 mm and the mat cutouts 23 approximately 23 mm×35 mm. The glass plates are approximately 0.75 mm thick. Any suitable dimensions can be used for the various slide components depending upon the size of the film but the mats 22 should have enough opaque material surrounding the film image bearing portion to adequately block stray light from affecting the film image.

The slide of the invention has a number of advantages. It permits the adaptation of relatively conventional projector-slide technology to an unaided night vision or NVG training application where extremely low light levels are required. The light level received by the film can be controlled and reduced to levels acceptable for such training. Both the mats and the filters contribute to the reduction of stray light reaching the film. The filters are held in a stable fixed relationship to the film. Also, the film is well protected from heat to prevent it from physically distorting even though it may be receiving light for a long period of time. Individual slides are modular in that they can be removed and modified as needed.

We claim:

1. A projector slide for night vision training comprising:

a film having an image containing portion for receiving light from a source on one face thereof to project the image;

at least one filter opposite the light receiving face of the film to produce a low level of light simulating available light in night viewing situations and at a spectral sensitivity compatible with night vision goggles by controlling at least one characteristic of the light that the film receives from the source selected from the group consisting of attenuating the light and modifying the spectrum of the light;

a mat of opaque material with an opening corresponding to and aligned with the film image portion adjacent the light receiving side of the film for reducing the amount of stray light reaching said film image portion; and means for holding together an assembly of said film, said at least one filter and said mat.

2. A slide as in claim 1 wherein said at least one filter is adjacent the light receiving face of the film with the mat being closer to the light source than the said at least one filter.

3. A slide as in claim 1 wherein said holding means comprises a frame member opposite each face of said film and means for fastening the frame members together.

4. A slide as in claim 3 further comprising a respective glass plate held by each frame member.

5. A slide as in claim 2 further comprising a mat of opaque material adjacent the other face of said film and having an opening corresponding to and aligned with said film image bearing portion.

6. A slide as in claim 5 wherein said holding means comprises a frame member opposite each face of said film and holding the mats with said film and said at least one filter therebetween, and means for fastening said frame members together.

7. A slide as in claim 6 further comprising a respective glass plate held by each frame member adjacent to a respective mat.

8. A slide as in claim 1 wherein said at least one filter include a combination of a plurality of filters selected to obtain a desired intensity for the light reaching the film.

9. A slide as in claim 8 wherein the filters are selected from the group consisting of neutral density filters, exposed and developed color film and exposed and developed black and white film.

10. A slide as in claim 5 wherein said at least one filter include a combination of a plurality of filters selected to obtain a desired intensity for the light reaching the film.

11. A slide as in claim 10 wherein the filters are selected from the group consisting of neutral density filters, exposed and developed color film and exposed and developed black and white film.

\* \* \* \* \*